United States Patent [19]

Curameng et al.

[11] Patent Number: 5,313,712
[45] Date of Patent: May 24, 1994

[54] SCUBA DIVING INSTRUMENT CONSOLE HAVING SWIVELLING COMPASS ASSEMBLY

[75] Inventors: Timothy N. Curameng, Chicago; James R. Lutz, Round Lake Beach; Mark L. Walsh, Chicago, all of Ill.

[73] Assignee: Dacor Corporation, Northfield, Ill.

[21] Appl. No.: 119,894

[22] Filed: Sep. 10, 1993

Related U.S. Application Data

[63] Continuation of Ser. No. 905,730, Jun. 29, 1992, abandoned.

[51] Int. Cl.⁵ .................................................. G01C 17/00
[52] U.S. Cl. .................................. 33/354; 33/355 R; 73/431; 73/300
[58] Field of Search .................. 33/354, 333, 334, 349, 33/352, 355 R; 73/431, 714, 865.1, 300; 116/26, 280, 300, 305, DIG. 43

[56] References Cited

U.S. PATENT DOCUMENTS

| | | | |
|---|---|---|---|
| 2,396,202 | 3/1946 | Reitzer | 33/354 |
| 3,660,907 | 5/1972 | Sutherland | 33/349 |
| 3,828,611 | 8/1974 | Shamlian et al. | 73/431 X |
| 3,861,417 | 1/1975 | Rowe | 73/431 |
| 3,888,500 | 6/1975 | Gauthier | 33/333 X |
| 4,197,747 | 4/1980 | Koehler | 73/431 |
| 4,491,015 | 1/1985 | Allemano | 73/300 |
| 4,753,117 | 6/1988 | Osterhout et al. | 33/714 X |

FOREIGN PATENT DOCUMENTS

| | | | |
|---|---|---|---|
| 58550 | 10/1937 | Norway | 33/349 |
| 351225 | 2/1961 | Switzerland | 33/354 |
| 789942 | 1/1958 | United Kingdom | 33/354 |

OTHER PUBLICATIONS

1990 Tekna Catalog, Tekna, Redwood City, Calif., pp. 20, 21, 22 and cover page.

*Primary Examiner*—William A. Cuchlinski, Jr.
*Assistant Examiner*—Alvin Wirthlin
*Attorney, Agent, or Firm*—Greer, Burns & Crain, Ltd.

[57] ABSTRACT

An instrument console for use in scuba diving includes a console body having a first end adapted for connection to a pressurized air line, and a second end opposite the first end, at least one instrument being secured within the console body, a compass having top and side Lubber Lines, a compass housing configured to accommodate the compass and being connected to the second end of the console body to pivot relative to the console body, so that while held in front of the swimming diver, the compass may be maintained and read in a generally horizontal position, and the instruments may be viewed in a generally vertical position.

18 Claims, 3 Drawing Sheets

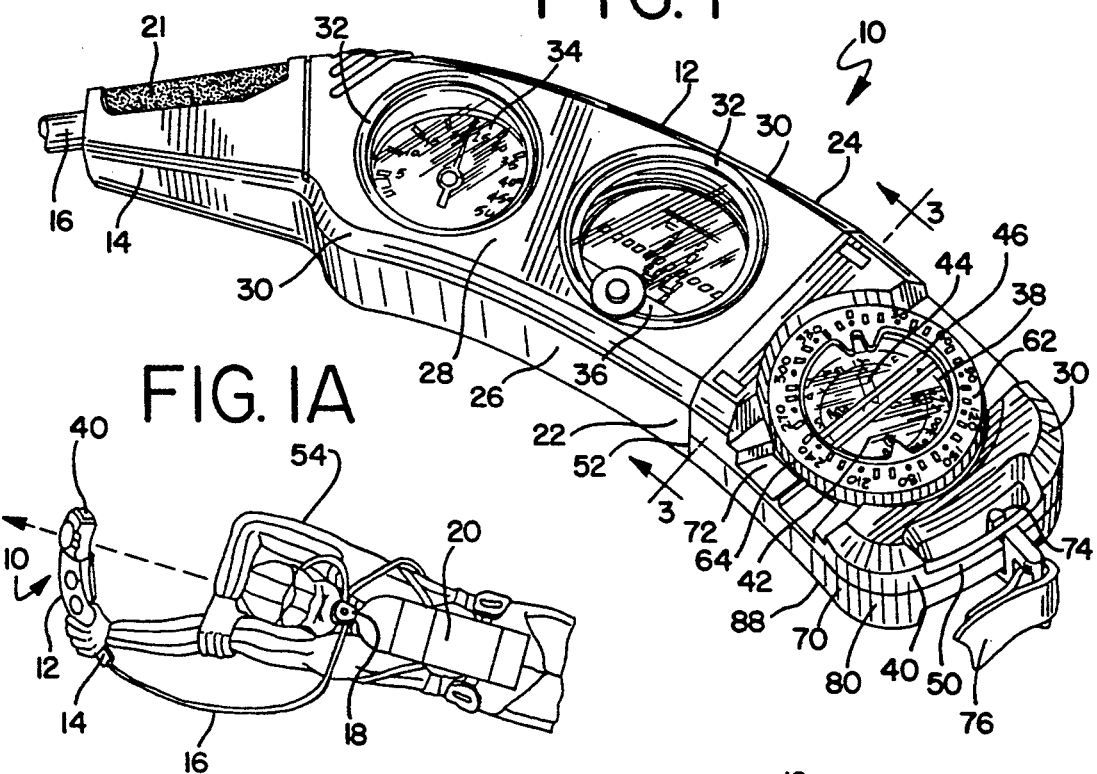
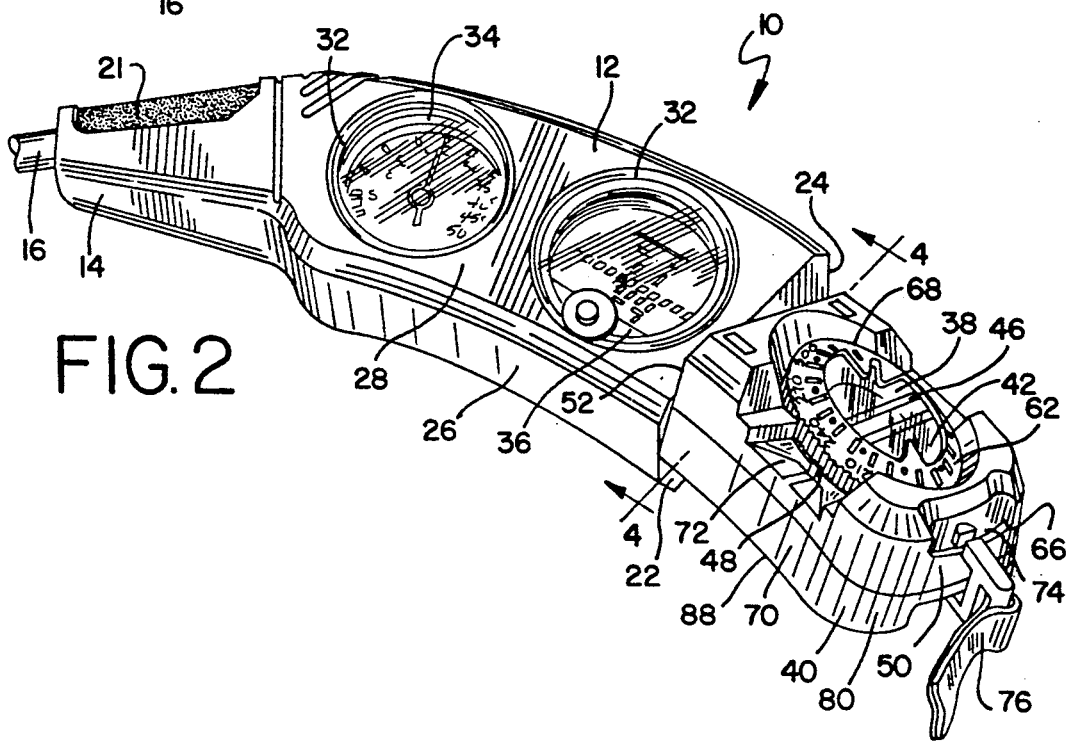

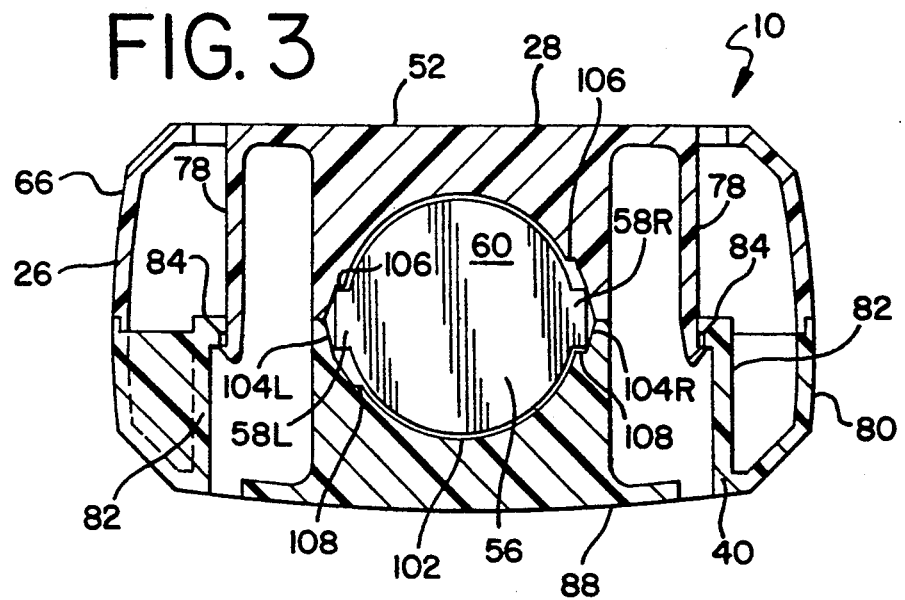
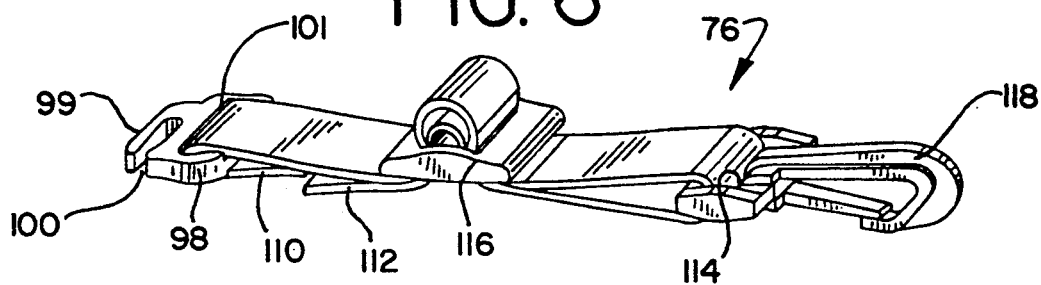
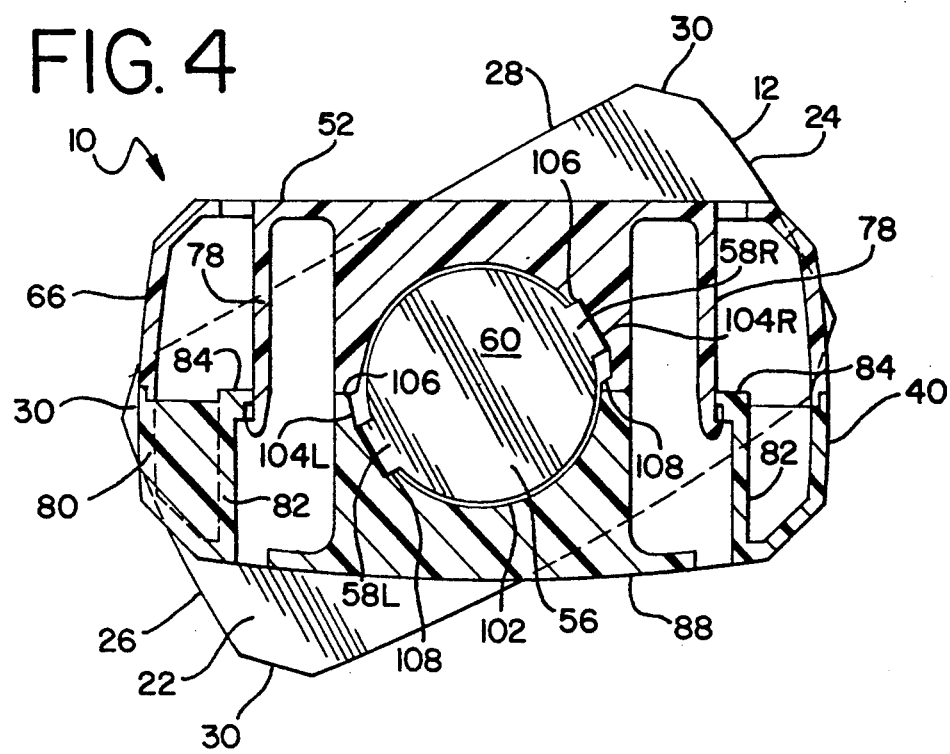

SCUBA DIVING INSTRUMENT CONSOLE HAVING SWIVELLING COMPASS ASSEMBLY

This is a continuation of application Ser. No. 07/905,730 filed Jun. 29, 1992 now abandoned.

BACKGROUND OF THE INVENTION

The present invention relates to instrument consoles used by scuba divers, and specifically to an instrument console equipped with a compass housing which is pivotable to provide greater diver visibility and comfort in viewing the compass as well as other instruments of the console while swimming.

Conventional scuba diving instrument consoles include at least one gauge, such as a pressure gauge, a depth gauge (either analog or digital), a dive computer, a dive timer and possibly a compass. Gauges not found on the console may be worn on the diver's wrist or on other equipment. Often, the compass assemblies are secured to the existing instrument console body in a fixed position.

The console is mounted at one end to a flexible pressurized air conduit which is connected to the first stage regulator. Opposite the air line connection point, the console is secured to the diver's buoyancy compensator jacket by a strap to hold the console relatively close to the diver's body when not in use.

The fixed position mounting arrangement of conventional compass assemblies is often determined without any consideration of the ergonomic aspects of the operational position of the compass in relation to the diver. More specifically, conventional fixed compass assembly instrument consoles require the diver's head and neck to assume an awkward position when viewing the compass, as well as the other instruments of the console.

When navigating underwater, it is recommended that the diver assume a generally horizontal planar position to maximize directional stability and reduce drag. To reinforce this planar attitude, divers are encouraged to use the "L4" position, where, when in use, the instrument cosnsole is held in the left hand at a right angle the extended left arm to define an "L" as seen from above. The console is held in front of the diver where the gauges may be read. In addition, the right upper arm extends horizontally forward, and the right hand grasps the left elbow to define a "4" as seen from above.

When conventional diving instrument consoles are held in the L4 position, the gauges are often difficult to read unless placed in an uncomfortable, drag inducing position, and the console itself creates significant drag in the water, further fatiguing the diver. In the case of compass assemblies which are fastened to conventional consoles, the console position must be moved to an often awkward position to enable the diver to view the Lubber Line, or line of forward travel, which is marked on the crystal of the compass. If the compass is held vertically to view the Lubber Line, the accuracy of the needle position may be affected.

Another important ground rule of underwater navigation is that the diver should refrain from looking down while swimming, since the act of moving the head downward makes it difficult to maintain the preferred horizontal orientation. When a diver looks directly at his person, or close objects, he loses conception of his attitude, and further concentration will disturb knowledge of position and direction, until he looks up again.

Accordingly, it is an object of the present invention to provide a scuba diving instrument console with a compass assembly which is ergonomically positioned.

It is another object of the present invention to provide a scuba diving instrument console in which the compass assembly is pivotable relative to the console.

It is still another object of the present invention to provide a compass housing for a scuba diving instrument console in which the Lubber Line is readily visible to the diver to encourage the diver's use of the compass, and to minimize fatigue while doing so.

It is a further object of the present invention to provide a scuba diving instrument console in which the console may be readily detached from the buoyancy compensator jacket when used by the diver.

It is yet another object of the present invention to provide a scuba diving instrument console having a compass housing which encourages the diver to use the console in the L4 position, instead of maintaining the console at the diver's waist, which encourages unwanted lowering of the head.

SUMMARY OF THE INVENTION

The above-identified objects are achieved and/or exceeded by the present scuba diving instrument console, which is provided with a pivotable compass housing for facilitating diver visibility of the compass and promoting directional swimming stability.

More specifically, the present invention provides an instrument console for use in scuba diving, including a console body having a first end adapted for connection to a pressurized air line, and a second end opposite the first end, at least one instrument being secured within the body, a compass having at least one Lubber Line, and a compass housing configured to accommodate the compass and being connected to the second end of the console body to be pivotal relative to the console.

The present invention also provides a compass assembly for use in a scuba diving instrument gauge console having a body with a first end adapted for connection to a pressurized air line, and a second end having an axially extending mounting formation. The compass assembly includes a compass having an upper Lubber Line and a side Lubber Line, a compass housing configured to accommodate the compass and having a face with a window in an upper end, the housing being pivotable about the mounting formation so that when the compass housing is pivoted to a horizontal position relative to the console, the side Lubber Line is visible through the window.

BRIEF DESCRIPTION OF THE DRAWINGS

FIG. 1 is a top perspective elevational view of the present instrument console for scuba diving, with the pivotable compass assembly shown in alignment with the console;

FIG. 1A is a fragmentary plan view of a diver employing the instrument console of FIG. 1 while swimming in the recommended L4 position;

FIG. 2 is a top perspective elevational view of the console of FIG. 1 with the main instrument console shown at a viewing angle as used by a diver, with the compass assembly shown in the forward pivoted position;

FIG. 3 is a sectional view taken along the line 3—3 of FIG. 1 and in the direction indicated generally;

FIG. 4 is a sectional view taken along the line 4—4 of FIG. 2 and in the direction indicated generally;

FIG. 6 is a top perspective elevational view of the lanyard assembly used with the present instrument console and compass assembly.

DETAILED DESCRIPTION OF THE PREFERRED EMBODIMENT

Figure 5:
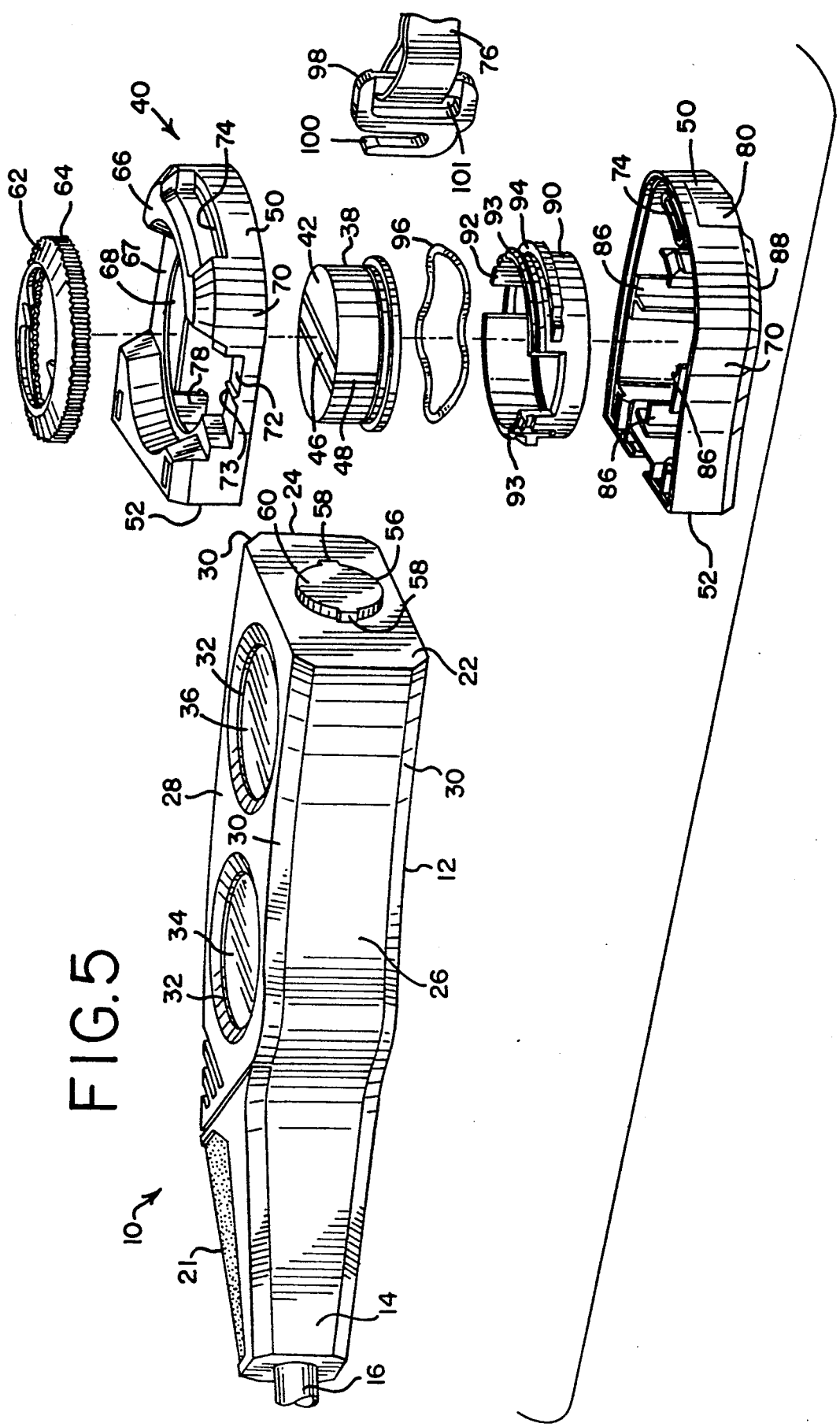
FIG. 5 is an exploded perspective elevational view of the present instrument console and compass assembly of FIG. 1.

Referring now to FIGS. 1, 1A and 2, the present scuba diving instrument console is generally indicated at 10. The console 10 includes a console body 12 having a first end 14 adapted for connection to a pressurized air line 16, which in turn is connected to a first stage regulator 18 of a scuba air tank 20. The first end 14 may be provided with at least one gripping formation 21 to facilitate the grasping of the body 12 by the diver.

The console body 12 also includes a second end 22 opposite the first end 14, a front face 24, a rear face 26 and a top surface 28. The console body 12 is preferably provided with a generally curved, banana-like shape to generally conform to the diver's torso at the waist. In addition, the body 12 is vertically flattened, and the front face 24 is generally streamlined to minimize drag, with upper and lower beveled edges 30.

At least one instrument is secured within the body 12 to be readable from the top surface 28. The instruments are retained within instrument cavities 32, and in the preferred embodiment include a pressure gauge 34, and a digital depth gauge 36. It is contemplated, however, that other conventional scuba instruments may be provided in the cavities 32, such as dive computers, analog depth gauges, thermometers, etc. as may be warranted in particular dive situations, or depending on the interests of the diver.

One such instrument is a compass 38, which is shown mounted in a compass housing 40. The compass 38 includes a crystal 42 through which a needle 44 and directional markings (not shown) are visible. A top Lubber Line 46, shown as a pair of parallel lines, is permanently positioned in the crystal 42 and immovably extends in the forward direction of travel. Also provided to the compass 38 is a side Lubber Line 48 (best seen in FIG. 2).

Compass housing 40 is provided with a first end 50, and a second end 52 opposite the first end, and directly adjacent the second end 22 of the console body 12. The compass housing 40 is connected to the second end 22, and as seen in FIG. 2, the compass housing 40 is pivotable in relation to the longitudinal axis of the console body 12.

Referring now to FIG. 1A, a diver 54 is shown in the L4 position, which is recommended to promote stability in the direction of swimming. In this position, the diver 54 maintains a relatively horizontal position in the water, and the left arm, grasping the console 10, defines an "L" as seen from above. The right arm reaches forward and bends at the elbow to grasp the left elbow, thus defining a "4". This position encourages the diver 54 to swim a straight course in the intended direction. Also, the instrument console 10 is placed within the diver's forward glance, and looking downward is discouraged, since the gauges are all readily visible without movement of the head.

In FIGS. 1A and 2, a major feature of the present instrument console 10 is illustrated, that being the pivotability of the compass housing 40 relative to the console body 12. When the compass housing 40 is pivoted forward, as shown in FIGS. 1A and 2, the side Lubber Line 48 is visible. Thus, the compass 38 is maintained in a generally horizontal position when the diver 54 holds the console body 12 in a generally vertically-oriented, or slightly inclined position to read the gauges 34 and 36 (best seen in FIG. 4). The horizontal orientation promotes accuracy of the compass 38.

Referring now to FIG. 5, the console body 12 and the compass housing 40 are shown in greater detail. The second end 22 of the console body 12 is preferably truncated to have a flat face, and has an axially projecting stem 56. In the preferred embodiment, the stem 56 is centrally located on the second end 22 and is an integral part of the body 12. Stem 56 is generally cylindrical and is provided with at least one generally radially projecting lug 58 which is used to limit the amount of pivotal movement of the compass housing 40 relative to the console body 12. Two such lugs 58 are preferably provided to the console 12, the lugs being positioned in diametrically opposing relationship to each other. A truncated end face 60 defines the end of the stem 56.

Compass housing 40 includes a bezel 62 with a preferably knurled or otherwise textured outer edge 64 to facilitate rotation of the bezel about the compass 38. An upper portion 66 of the compass housing 40 includes an annular lip 67 which defines a central opening 68 dimensioned to accommodate the bezel 62. A rear face 70 is provided with a window notch 72 in its upper edge through which the diver may read the side Lubber Line 48. Notch 72 may include an indicator rib 73.

At the first end 50 of the compass housing 40 is an elongate track-like attachment bracket 74 for a tether strap 76. The bracket 74 is integrally formed in the upper portion 66, and takes the form of an elongate slot. At least one and preferably three biased, barb-shaped attachment clips 78 depend from the underside of the upper portion 66 in order to secure the upper portion to a lower portion 80 of the compass housing 40. The lower portion 80 is generally a mirror image of the upper portion 66 in its peripheral configuration. Also, the first end 50 of the lower portion includes a lower half of the attachment bracket 74.

The lower portion 80 also includes at least one and preferably three vertically projecting attachment formations 82 (best seen in FIG. 3) which are disposed to correspond with, and be engaged by, the barb-shaped attachment clips 78. Each attachment formation 82 has a tab 84 over which the barb-shaped clip passes and which prevents the clip, as well as the upper portion 66, from becoming disengaged from the lower portion 80.

A plurality of vertical compass supports 86 project from the lower surface 88 of the lower portion 80, and are disposed for supporting a compass base 90 within the lower portion. The compass base 90 is generally bucket-shaped with an open upper end 92, and is dimensioned to accommodate the compass 38 therein. The upper end 92 has a plurality of radially projecting tabs 93. A peripheral lip 94 of the compass base 90 is dimensioned to contact the underside of the lip 67.

To assemble the compass housing 40, a spring wave washer 96 is placed in the compass base 90 and the compass 38 is positioned in the base upon the washer 96. The compass base 90 is then raised vertically until the upper end 92 projects through the opening 68 and the peripheral lip 94 engages the annular lip 67. Next, the rotating bezel 62 is snap-fit around the tabs 93 to secure the compass base 90 to the upper portion 66. The configuration of the lip 94 prevents the compass base 90 from rotating relative to the housing 40, and the wave washer 96 prevents the compass 38 from rotating relevant to the compass base 90 when the bezel 62 is installed. Upper and lower portions 66, 80 are secured to each other through the engagement of the barb-shaped clips 78 with the tabs 84. Upon assembly, the compass supports 86 contact and support the compass base 90.

A hook 98 is configured to slidingly engage the elongate attachment bracket 74 with a friction fit to enable the diver to rapidly disengage the instrument console 10 from the tether strap 76 when the L4 position (FIG. 1A) is to be assumed. The sliding engagement of the hook 98 along the attachment bracket 74 permits the diver to manipulate the console body 12 for optimum visibility without detaching the tether strap 76. The hook 98 includes an eyelet 101 through which the tether strap 76 is passed. In order to prevent unwanted disengagement of the hook 98 from the bracket 74, the hook is preferably configured with a releasable locking formation 99. Formation 99 includes a tapered upper end to define a narrowed opening 100 which permits disengagement of the hook 98 from the bracket 74 only upon forceful twisting movement of the hook to a generally horizontal position by the diver (best seen in FIG. 6).

Referring now to FIGS. 3 and 4, at the second end 52 of the compass housing 40, which is located adjacent the second end 22 of the console body 12, an opening 102 is provided for pivotally engaging the axial stem 56. The opening 102 is provided with at least one, and preferably two detents 104, designated 104L and 104R, which are diametrically opposed and configured to serve as stop members for the lugs 58 projecting radially from the stem 56.

In operation, and referring to FIGS. 3 and 4, in the aligned position (best seen in FIGS. 1 and 3), the compass housing 40 is aligned with the console body 12, and the lugs 58 are located so that the left hand lug 58L contacts an upper end 106 of the corresponding detent 104L, and the right hand lug 58R contacts the lower end 108 of the corresponding detent 104R.

An important feature of the present instrument console 10 is that the compass housing 40 is permitted limited pivoting movement relative to the console body 12. It has been found that a comfortable and easily readably compass position results when the compass housing 40 is pivoted forward approximately 30° relative to the console body 12 (best seen in FIG. 2). The detents 104 are dimensioned to permit this limited pivotal movement in one direction from the aligned position and allow return to the same position. The pivoting action of the compass housing 40 is limited by the engagement of the lugs 58 with the upper and lower ends 106, 108, respectively, of the detents 104 (best seen in FIG. 4). Specifically, as shown in FIG. 4, the right hand lug 58R will engage the upper end 106 of the right hand detent 104R and the left hand lug 58L will engage the lower end 108 of the left hand detent 104L.

When the instrument console body 12 is positioned generally vertically relative to the plane of travel (as shown in FIG. 1A), and the compass housing 40 is pivoted forward, the diver 54 may easily monitor the gauges 34, 36 while also reading the compass 38 through the window notch 72. Also, the compass housing 40 is maintained in a generally horizontal orientation to optimize compass operation.

Referring to FIGS. 5 and 6, in applications where the diver 54 prefers that instead of being hand-held while swimming, the console 10 remains attached to the tether strap 76. The strap 76 is designed to be stretchable so that the diver may quickly bring up the console to the L4 position for a navigational reading. To this end, the tether strap is preferably made from elastic material, such as elastic nylon webbing. One end 110 of the strap 76 is looped through the eyelet 101 of the hook 98 and the other end 112 is looped through a snap hook eyelet 114 and passed through a buckle 116 to adjust the length of the strap. A retainer snap hook 118 is pivotally joined to the snap hook eyelet 114. Retainer snap hook 118 is designed for attachment to a D-ring on the diver's buoyancy compensator vest. The elastic nature of the tether strap 76 permits the diver to bring the console 10 to the L4 position even while the console is strapped to the buoyancy compensator vest. When the diver 54 has verified his compass heading, and/or checked the instruments 34, 36, the console 10 is returned to a position relatively close to the diver's body and is maintained there by the tether strap 76.

Thus, the present instrument console 10 features a streamlined silhouette to minimize water drag, and an easily readable array of instruments, including a compass, which may be readily monitored by the diver while swimming in the L4 position. Further, while the diver is swimming and monitoring the side Lubber Line of the compass, the pivotable feature of the present compass housing enables the compass to be maintained at a generally horizontal position for greater accuracy. Even if the diver chooses to secure the console to the buoyancy compensator, the compass housing may be positioned for easy reading without drastically disrupting the diver's attitude in the water.

While a particular embodiment of the scuba diving instrument console having a swivelling compass assembly of the invention has been shown and described, it will be appreciated by those skilled in the art that changes and modifications may be made thereto without departing from the invention in its broader aspects and as set forth in the following claims.

What is claimed is:

1. An instrument console for use by a diver while diving, comprising:
    a console body having a longitudinal axis, being adapted for connection to a pressurized air line, and wherein said console body has at least one instrument secured therein;
    a compass;
    a compass housing configured to accommodate said compass and being connected to said console body to be positionable into a laterally arranged relationship with said at least one instrument while held by the diver for monitoring, and also to be pivotal about said longitudinal axis of said console body, so that when the diver swims in a generally horizontal position with said console body held with an outstretched arm, said compass housing may also be adjusted to a generally horizontal position relative to said console body to promote accuracy in reading of said compass by the diver.

2. The instrument console as defined in claim 1 wherein said housing is pivotable to a limited extent in one direction from an aligned position where said housing is in alignment with the console.

3. The instrument console as defined in claim 2 wherein said housing is pivotable up to approximately 30° in one direction from the aligned position and allows return to the same position.

4. The instrument console as defined in claim 1 wherein said console body is curved in a general banana shape to generally conform to the diver's body curvature.

5. The instrument console as defined in claim 1 wherein said console body is generally vertically flattened and has a generally streamlined forward edge to minimize drag.

6. The instrument console as defined in claim 1 wherein said console body has a first end and a second end, said second end of said console body is provided with a stem projecting generally axially from said second end.

7. The instrument console as defined in claim 6 further including at least one lug radially projecting from said stem.

8. The instrument console as defined in claim 7 wherein said stem is provided with a pair of said lugs located diametrically opposed to each other.

9. The instrument console as defined in claim 6 wherein said compass housing has a second end disposed opposite said second end of said console body, and said second end of said compass housing is provided with an opening for pivotally accommodating said stem.

10. The instrument console as defined in claim 9 wherein said stem has at least one radially projecting lug, and said opening has at least one detent dimensioned to accommodate said at least one lug therein for restricting the pivotal movement of said compass housing relative to said instrument console body.

11. The instrument console as defined in claim 1 wherein said compass housing includes a bezel dimensioned to surround a face of said compass and being rotatable about said face.

12. The instrument console as defined in claim 1 wherein said compass housing includes an elongate, tracklike attachment bracket for a tether strap, said console further including a tether strap having a hook attached at one end thereof, said hook being configured to releasably and slidably engage said attachment bracket to permit manipulation of said console relative to the diver without disengaging said hook from said compass housing.

13. The instrument console as defined in claim 12 wherein said tether strap is elastic.

14. The instrument console as defined in claim 1 wherein said compass has top and side Lubber Lines, and said compass housing has a rear face with a window for viewing said side Lubber Line of said compass when said compass housing is pivoted relative to said console body, so that when said console is held in front of a swimming diver in a generally vertical position, said pivoted compass housing is in a generally horizontal position.

15. An instrument console for use in scuba diving, comprising:
a console body having a first end adapted for connection to a pressurized air line, and a second end opposite said first end, at least one instrument being secured within said body;
a compass having at least one Lubber Line;
a compass housing configured to accommodate said compass and being connected to said second end of said console body to be pivotal to a limited extent relative to said console, said pivoting action being limited by stop formations located on said compass housing which are engaged by lug formations on said console body.

16. A compass assembly for use in a scuba diving instrument gauge console having a body with a longitudinal axis, a first end adapted for connection to a pressurized air line, a second end having an axially extending mounting means, and at least one instrument being secured within the body, said compass assembly comprising:
a compass having an upper Lubber Line and a side Lubber Line;
a compass housing configured to accommodate said compass, having a sidewall with a window in an upper end, said housing adapted to be mounted in a laterally arranged relationship to the console, having a side-by-side relationship to the at least one instrument, and also being adapted for pivotal movement about said mounting means and about the longitudinal axis of the console, so that when said compass housing is pivoted to a generally horizontal position relative to the console by a diver while swimming, said side Lubber Line is visible through said window;
wherein said compass housing is provided with limiting means for limiting the pivotal movement of said housing relative to the console body, said limiting means being engageable with the console, so that when the diver swims in a generally horizontal position with the console body held in an outstretched arm, said compass housing may also be adjusted to said generally horizontal position relative to said console body to promote accuracy in reading of said compass by the diver, while minimizing drag.

17. The compass assembly as defined in claim 16 wherein said compass housing is pivotable approximately 30° in one direction from an aligned position where said housing is in alignment with the console body, and allows return to the same position.

18. An instrument console for use by a diver while scuba diving, comprising:
a console body having a longitudinal axis, a first end adapted for connection to a pressurized air line, and a second end opposite said first end, at least one instrument being secured within said body;
a compass having at least one Lubber Line;
a compass housing configured to accommodate said compass and being connected to said second end of said console body to be in a laterally arranged relationship with said at least one instrument while held by the diver for monitoring, and also to be pivotal about said longitudinal axis of said console body, so that when the diver swims in a generally horizontal position with said console body held with an outstretched arm, said compass housing may also be adjusted to a generally horizontal position relative to said console body to promote accuracy in reading of said compass by the diver while minimizing drag.

* * * * *